United States Patent
Varkey et al.

(10) Patent No.: US 8,969,726 B2
(45) Date of Patent: Mar. 3, 2015

(54) TORQUE-BALANCED ELECTRICAL CABLE

(75) Inventors: Joseph Varkey, Sugar Land, TX (US);
Sheng Chang, Sugar Land, TX (US);
Vadim Protasov, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 748 days.

(21) Appl. No.: 12/465,769

(22) Filed: May 14, 2009

(65) Prior Publication Data

US 2009/0283295 A1 Nov. 19, 2009

Related U.S. Application Data

(60) Provisional application No. 61/053,054, filed on May 14, 2008.

(51) Int. Cl.
*H01B 9/02* (2006.01)
*H01B 7/04* (2006.01)

(52) U.S. Cl.
CPC .................................. *H01B 7/046* (2013.01)
USPC .................................................. 174/106 R

(58) Field of Classification Search
USPC .......... 174/102 R, 106 R, 128.1, 128.2, 113 R
See application file for complete search history.

(56) References Cited

U.S. PATENT DOCUMENTS

| | | | | |
|---|---|---|---|---|
| 1,348,033 | A * | 7/1920 | Moon | 57/214 |
| 2,216,340 | A * | 10/1940 | Elliott | 174/103 |
| 2,463,590 | A * | 3/1949 | Arutunoff | 174/108 |
| 2,604,509 | A * | 7/1952 | Blanchard | 174/108 |
| 4,131,758 | A * | 12/1978 | Felkel | 174/107 |
| 4,358,636 | A * | 11/1982 | Ijff et al. | 174/103 |
| 4,654,476 | A * | 3/1987 | Barnicol-Ottler et al. | 174/116 |
| 7,170,007 | B2 | 1/2007 | Varkey et al. | |
| 7,235,743 | B2 | 6/2007 | Varkey | |
| 7,326,854 | B2 | 2/2008 | Varkey | |
| 7,402,753 | B2 | 7/2008 | Varkey et al. | |
| 7,465,876 | B2 | 12/2008 | Varkey | |
| 7,586,042 | B2 | 9/2009 | Varkey et al. | |
| 7,700,880 | B2 | 4/2010 | Varkey et al. | |
| 7,730,936 | B2 | 6/2010 | Hernandez-Solis et al. | |
| 2006/0242824 | A1* | 11/2006 | Varkey et al. | 29/825 |

* cited by examiner

*Primary Examiner* — Chau N Nguyen
(74) *Attorney, Agent, or Firm* — Trevor Grove

(57) ABSTRACT

An embodiment of a wellbore cable comprises a cable core, at least a first armor wire layer comprising a plurality of strength members and surrounding the cable core, and at least a second armor wire layer comprising a plurality of strength members surrounding the first armor wire layer, the second armor wire layer covering a predetermined percentage of the circumference of the first armor wire layer to prevent torque imbalance in the cable.

16 Claims, 3 Drawing Sheets

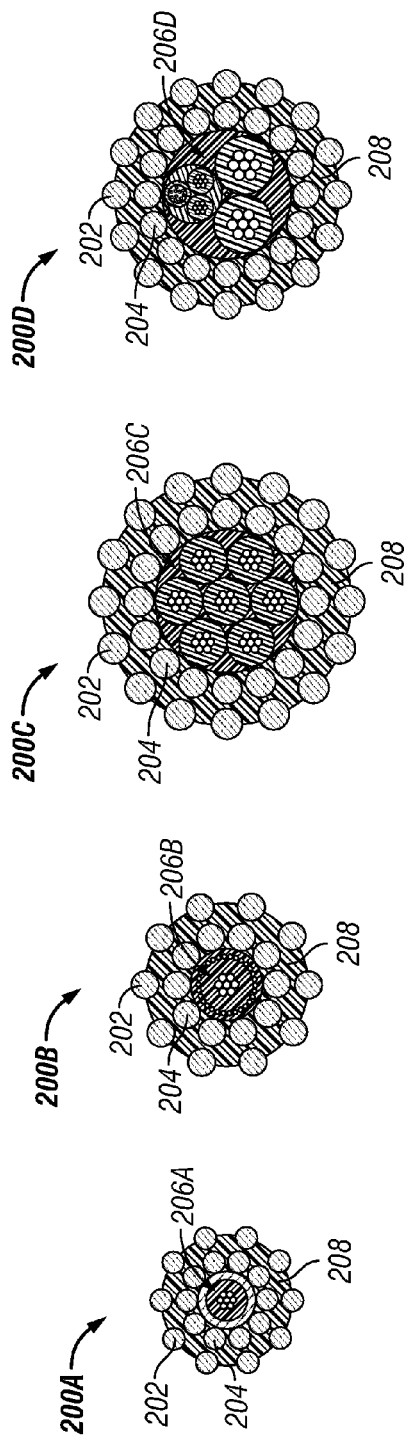
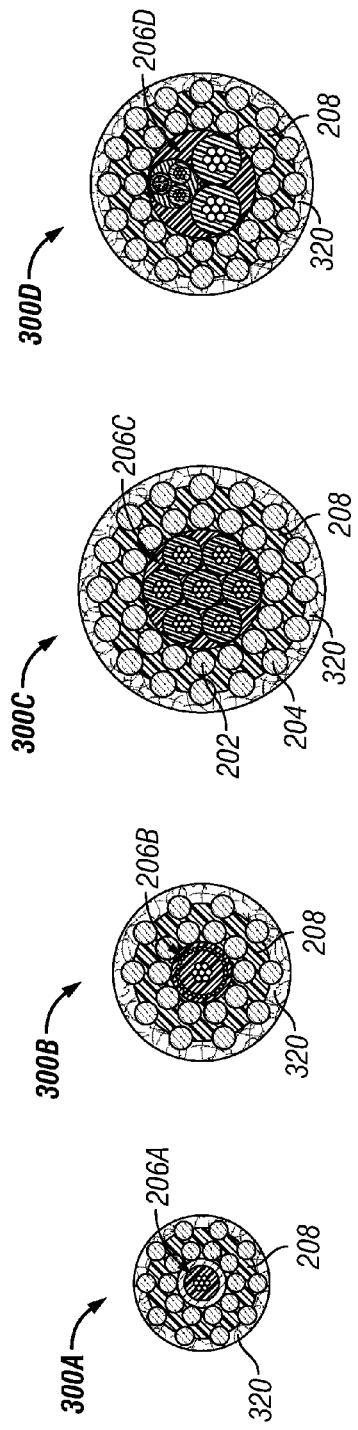

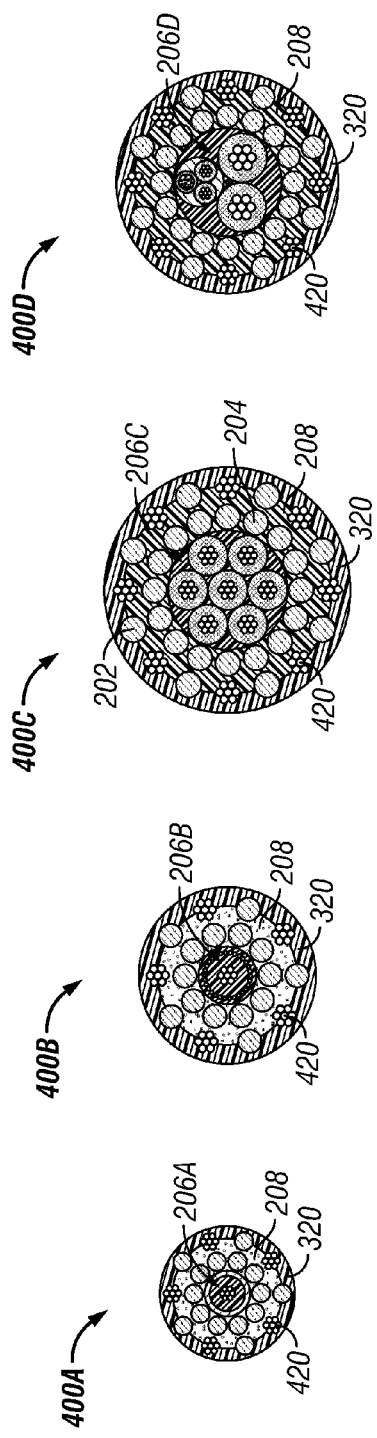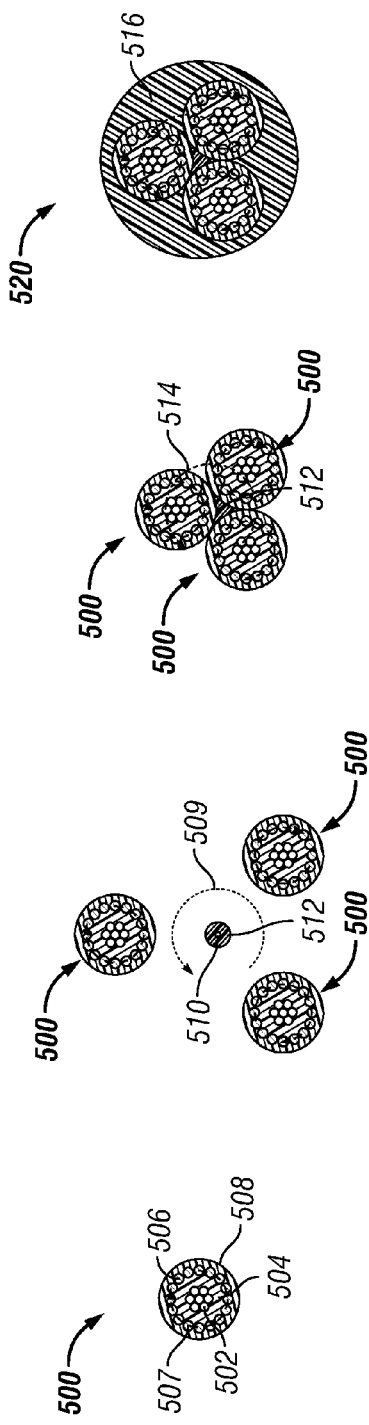

TORQUE-BALANCED ELECTRICAL CABLE

CROSS-REFERENCE TO RELATED APPLICATION

This application is entitled to the benefit of, and claims priority to, provisional patent application 61/053,054 filed May 14, 2008, the entire disclosure of which is incorporated herein by reference.

BACKGROUND

The statements in this section merely provide background information related to the present disclosure and may not constitute prior art. The present disclosure invention is related in general to cable systems and, in particular, to wireline cables.

Typical wireline cable designs consist of a cable core of one or more insulated conductors (packed in an interstitial filler in the case of multiple conductors) wrapped in cabling tape followed by the application of two armor wire layers. The armor wire layers are applied counterhelically to one another in an effort to minimize torque imbalance between the layers. These armor wires provide the strength needed to raise and lower the weight of the cable and tool string and protect the cable core from impact and abrasion damage. In an effort to provide additional protection against impact and abrasion damage, larger-diameter armor wires are placed in the outer layer. Torque imbalance between the armor wire layers, however, continues to be an issue, resulting in cable stretch, cable core deformation and significant reductions in cable strength.

In pressurized wells, gas can infiltrate through gaps between the armor wires and travel along spaces existing between the inner armor wire layer and the cable core. Grease-filled pipes at the well surface typically provide a seal at the well surface. As the wireline cable passes through these pipes, pressurized gas can travel through the spaces between the inner armor wires and the cable core. When the cable then passes over and bends over a sheave, the gas may be disadvantageously released.

Typical wireline designs have approximately 98% coverage with each layer of armor wire. If the coverage is too low, the armor wires may disadvantageously move along the cable and the cable may have loose wires.

Torque for a layer of armor wire can be described in the following equation.

$$\text{Torque} = \tfrac{1}{4} T \times PD \times \sin 2\alpha$$

Where:
T=Tension along the direction of the cable
PD=Pitch Diameter of the Armor Wires
α=Lay angle of the wires Referring now to FIG. 1, since the outer armor wire layer 12 of the cable 10 carries more loads and has a larger pitch diameter, the torque generated by the outer armor wire layer 12 (indicated by an arrow 13) is generally larger than the torque generated by inner armor wire layer 14 (indicated by an arrow 15), which disadvantageously results in torque imbalance for the cable 10.

Torque imbalance in the cable 10 is disadvantageous because a cable core 16 may deform into the interstitial spaces between the inner armor wires 14, reducing the diameter of the cable 10. The cable 10 may disadvantageously have more stretch and the core 16 may be damaged. As the diameter of the cable 10 is reduced, the pitch diameter of inner armor 14 has a larger percentage reduction than the pitch diameter of outer armor 12, which may further complicate torque imbalance.

It is desirable, therefore, to provide a torque-balanced and damage resistant wireline cable.

SUMMARY

An embodiment of a wellbore cable comprises a cable core, at least a first armor wire layer comprising a plurality of strength members and surrounding the cable core, and at least a second armor wire layer comprising a plurality of strength members surrounding the first armor wire layer, the second armor wire layer covering a predetermined percentage of the circumference of the first armor wire layer to prevent torque imbalance in the cable. Alternatively, the predetermined percentage comprises about 50 percent to about 90 percent of the circumference of the first armor wire layer. Alternatively, the strength members of the second armor wire layer comprise at least one stranded armor wire member. Alternatively, the cable further comprises at least one layer of a polymeric material surrounding the cable core, the first armor wire layer and at least a portion of the second armor wire layer. The polymeric material may bond to the first armor wire layer, the second armor wire layer, and the cable core. The cable core further may comprise a polymeric insulating layer and the polymeric material may bond to the insulating layer of the cable core.

Alternatively, the cable further comprises a polymeric jacket forming an outer layer of the cable, the jacket bonded to at least the outer strength members. The polymeric jacket may comprise a fiber-reinforced polymer. Alternatively, the cable core comprises one of a monocable, a coaxial cable, a triad cable, and a heptacable. Alternatively, a diameter of the strength members in the outer armor wire layer and the inner armor wire layer are substantially equal. Alternatively, a diameter of the strength members in the outer armor wire layer is greater than a diameter of the strength members in the inner armor wire layer. Alternatively, at least one of the conductors of the cable core comprises an optical fiber.

An embodiment of a wellbore cable comprises at least three conductors each comprising a cable core encased in a polymeric jacket, at least one armor wire layer disposed against the cable core at a lay angle, and a polymeric layer encasing the at least one armor wire layer, the conductors cabled together helically at a lay angle opposite the lay angles of the respective strength members to prevent torque imbalance in the cable. Alternatively, torque balance between the cables is achieved by adjustments in the opposing lay angles of the armor wires and the completed cable. Alternatively, the cable further comprises a polymeric jacket encasing each of the three cables. Alternatively, the cable further comprises a soft polymer central element disposed between the three cables. Alternatively, a diameter of a circle passing through the centers of each of the conductors is approximately the same size as the individual diameter of each of the three conductors. Alternatively, the cable cores comprise at least one of a monocable, a coaxial cable, a triad cable, and a heptacable. Alternatively, at least one of the cable cores comprises an optical fiber.

BRIEF DESCRIPTION OF THE DRAWINGS

These and other features and advantages of the present invention will be better understood by reference to the following detailed description when considered in conjunction with the accompanying drawings wherein:

FIGS. 2a through 2d are radial cross-sectional views of an embodiment of a cable.

FIGS. 3a through 3d are radial cross-sectional views of an embodiment of a cable.

FIGS. 4a through 4d are radial cross-sectional views of an embodiment of a cable.

FIGS. 5a through 5d are radial cross-sectional views of an embodiment of a cable.

DETAILED DESCRIPTION

Figure 1:
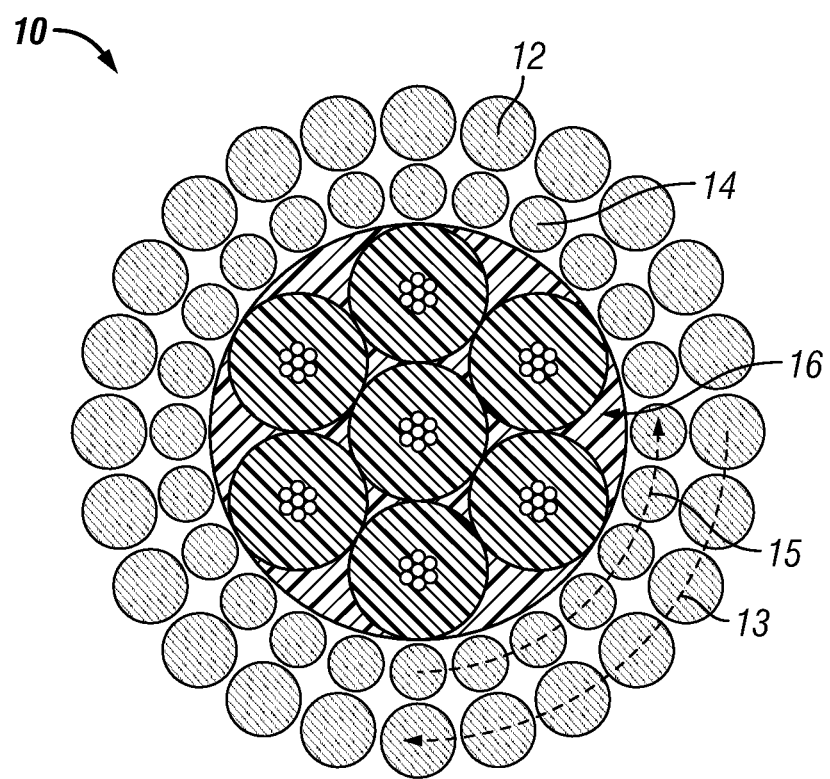
FIG. 1 is a is a radial cross-sectional view of a prior art wireline cable.

Referring now to FIGS. 2a through 2d, an embodiment of a cable is indicated generally at 200. FIGS. 2a-2d show a cable 200a, 200b, 200c, and 200d, respectively. The cables 200a, 200b, 200c and 200d comprise damage-resistant outer armor wires 202, which may advantageously be applied to any basic wireline cable configuration or core. In non-limiting examples, FIG. 2a shows a monocable cable core with stranded wires 206a, FIG. 2b shows a coaxial cable core 206b, FIG. 2c shows a heptacable cable core 206c, and FIG. 2d shows a triad cable core 206d having multiple cable conductors as part of the core 206d. The conductors forming the cable cores 206a, 206b, 206c, and 206d may be any combination of (but not limited to) monocables, coaxial cables, copper conductors, optical fibers (such as those shown in FIG. 2d) or the like and be insulated with any suitable polymeric material or materials as will be appreciated by those skilled in the art. As shown in FIGS. 2a-2d, the inner armor layer 204 carries more load since its pitch diameter is smaller than outer armor layer 202.

The outer armor wires 202 shown in FIGS. 2a-2d are sized similarly to the inner armor wires 204 but the layer of the outer armor wires 202 covers a predetermined percentage of the circumference of the inner armor wires 204 in order to prevent torque imbalance in the cable 200. The predetermined percentage of coverage may be, but not limited to, about 50% to about 90% coverage of the circumference of the inner armor wire layer 204, which is smaller than the percentage coverage of the armor wire layers 12 and 14 shown in the prior art cable 10 in FIG. 1. The predetermined percentage of coverage may be, but not limited to, about 50% to about 90% coverage of the circumference of the cable cores 206a, 206b, 206c, and 206d, which is smaller than the percentage coverage of the armor wire layers 12 and 14 and cable core 16 shown in the prior art cable 10 in FIG. 1. This smaller percentage of coverage of the outer armor wires 202 with respect to the inner armor wires 204 advantageously maintains the torque-balance of the cable 200a-200d and increases the ability of the outer armor wires 202 to withstand abrasion damage. In a non-limiting example, the number of armor wires in the inner armor layer 204 and the number of armor wires in the outer armor layer 202 are equal, providing a predetermined coverage in direct relation to the respective diameters of the individual armor wires 202 and 204 and radial spacing of the armor wire layers 202 and 204. The predetermined coverage may be selected by a number of factors which may include, but are not limited to, the size and/or diameter of the cable 200a-200d, the size and/or diameter of the cable core 206a-206d, the size and/or diameter of the individual members of the armor wire layers 202 and 204, and the radial spacing between the armor wire layers 202 and 204. The inner armor wires 204 may cover a predetermined percentage of the circumference of the cable core 206a-206d that may be, but is not limited to, about 98% to about 99% of the circumference of the cable core 206a-206d.

A polymeric insulating material 208 may be disposed on the inner armor wire layer 204, the cable core 206a, 206b, 206c, and 206d and a portion of the outer armor wire layer 202 and may bond the armor wire layers 202 and 204 to the cable core 206a-d, including the insulating layer of the cable core 206a-d. The insulating material 208 may be formed from any suitable material such as, but not limited to, the following: polyolefin or olefin-base elastomer (such as Engage®, Infuse®, etc.); thermoplastic vulcanizates (TPVs) such as Santoprene® and Super TPVs and fluoro TPV (F-TPV); silicone rubber; acrylate rubber; soft engineering plastics (such as soft modified polypropylene sulfide (PPS] or modified Poly-ether-ether-ketone [PEEK]); soft fluoropolymer (such as high-melt flow ETFE (ethylene-tetrafluoroethylene) fluoropolymer; fluoroelastomer (such as DAI-EL™ manufactured by Daikin); and thermoplastic fluoropolymers. The radial thickness of the insulating material 208 and thus the radial spacing between the armor wire layers 202 and 204 may be varied to achieve torque balancing of the cables 200a-200d and/or prevent torque imbalance of the cables 200a-200d, as will be appreciated by those skilled in the art.

FIGS. 3a-3d show the of cables of FIGS. 2a-2d having an outer jacket 320 bonded to the insulating material 208 to form a jacketed cable 300a, 300b, 300c, and 300d that correspond, respectively, to cables 200a, 200b, 200c, and 200d. Referring now to FIG. 3, there are shown embodiments of torque-balanced cables 300a, 300b, 300c, and 300d that comprise the cables shown in FIGS. 2a-2d having with damage-resistant outer armor wires with a bonded outer jacket 320. By providing the bonded outer polymeric jacket 320 over the embodiments shown in FIG. 2, the cable is preferably more easily sealed at the well surface. The outer jacket 320 may comprise any suitable material such as, for example, carbon-fiber-reinforced Tefzel®, carbon-fiber-reinforced ETFE (ethylene-tetrafluoroethylene) fluoropolymer or similar suitable material that is applied over the outer armor wire layer, bonding through the gaps in the outer strength members 204, which creates a totally bonded jacketing cable system 300a-300d. The addition of the fiber-reinforced polymer 320 also provides a more durable outer surface. The outer jacket 320 may be bonded to the insulating material 208 and/or to the outer armor wires 202.

FIGS. 4a-4d show the of cables of FIGS. 3a-3d comprising optional stranded wire outer armor wire layers 420 to form cable embodiments, indicated generally at 400a, 400b, 400c, and 400d. As an option to the embodiments shown in FIGS. 2a-2d and 3a-3d described above, any solid armor wire 202 or 302 in the outer layer may be replaced with similarly size stranded armor wires 420. The replacement of solid armor wire 202 with stranded armor wires 420 makes the cable 400a, 400b, 400c, and 400d more flexible. In addition, the stranded armor wires 420 have more friction and bonding with the jacket 320 and the jacket 320 over the stranded wires 420 also protects the small individual elements from abrasion and cutting.

Embodiments of the cables 200a, 200b, 200c, 200d, 300a, 300b, 300c, 300d, 400a, 400b, 400c, and 400d have a lower coverage, from about 50% to about 90%, in the outer armor layer 202. The cables maintain the size and durability of outer strength members 202 while creating torque balance between inner armor layers 204 and the outer armor layers 202. The weight of the cables is reduced because of the lower coverage percentage. The cable is preferably a seasoned cable and requires no pre-stress and also has less stretch. Because all interstitial spaces between the armor wires 202 and 204 are filled by polymers 208 and 320, the cables need less grease for the seal (not shown) at the well surface (not shown). Embodiments of the cables may comprise an outer layer of polymer 320 to create a better seal.

Embodiments of the cables 200a, 200b, 200c, 200d, 300a, 300b, 300c, 300d, 400a, 400b, 400c, and 400d minimize the problems described above by filling interstitial spaces among armor wires and the cable core with polymers 208 and 320, by using large diameter armor wires but a low coverage (50% to 90%) for the outer armor layer to reach torque balance, and by using a triad configuration, discussed in more detail below.

The polymeric layers 208 and/or 320 provide several benefits including, but not limited to, filling space into which the inner armor wire might otherwise be compressed thereby minimizing cable stretch, keeping cable diameter while cable at tension, reducing torque since the reduction in pitch diameter is minimized, eliminating the space in the cable along which pressurized gas might travel to escape the well, protecting the cable core from damage caused by inner armor wires, cushioning contact points among armor wires to minimize damage caused by armor wires rubbing against each other, sitting low coverage outer armor wires to avoid loose wires, and produces seasoned alloy cables.

The low coverage (about 50% to about 90%) of armor wire in the outer layer 202 or 420 provides several benefits including, but not limited to, maintaining torque balance, maintaining the size and durability of outer armor wires 202 or 420, and lowering the weight of the cable by reducing the coverage of the armor wire 202 or 420.

Referring now to FIGS. 5a-5d, there is shown an embodiment of a torque-balanced triad cable configuration 520 in which the armor wire may be any kind of strength member. The cable may be constructed as follows:

As shown in FIG. 5a, individual conductors 500 may be constructed with a copper, optical fiber or other conductor or conductors 502 at the center contained in a hard polymeric insulation 504. Armor wires 506 may be cabled helically in a direction indicated by an arrow 507 over the polymer 504 and a second layer of softer polymer 508 is extruded over the armor wires 506.

As shown in FIG. 5b, preferably three conductors 500, as shown in FIG. 5a, are cabled together at a lay angle, indicated by an arrow 509, opposite to that of the lay angle 507 of the armor wires 506 in the individual conductors 500. Alternatively, a central member 510 with soft polymer insulation 512 is placed at the center of the three conductors 500.

As shown in FIG. 5c, when the three conductors 500 are cabled together, the soft polymer 512 on the central element deforms to fill the interstitial space between the three conductors 500. The diameter of a circle passing through the centers of each of the three conductors 500 (indicated by an arrow 514) is preferably approximately the same size as the individual diameter of each of the three conductors 500, which allows the cable to achieve torque balance by slight adjustments in the opposing lay angles of the armor wires 506 and the completed cable 500.

As shown in FIG. 5d, a final hard polymeric jacket 516, which may be pure polymer or short-fiber-amended polymer or another suitable material, is extruded over the cabled conductors 500 to complete the cable 520.

The cable 520 comprises a low weight torque balanced cable in a triad cable configuration. This embodiment comprises only one layer of armor 506 in each conductor 500 of the triad cable. The lay direction of the armor wire 506 is preferably opposite to the lay direction of the triad 509 to reach torque balance. The triad configuration of the cable 520 provides several benefits including, but not limited to, keeping torque balance of the cable 520, minimizing the contact points of armor wires to minimize damage caused by armor wires 506 rubbing against each other, and lowering the weight of the cable 520 by using only one layer of armor wire 506 in each conductor 500.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values. Accordingly, the protection sought herein is as set forth in the claims below.

The preceding description has been presented with reference to presently preferred embodiments of the invention. Persons skilled in the art and technology to which this invention pertains will appreciate that alterations and changes in the described structures and methods of operation can be practiced without meaningfully departing from the principle, and scope of this invention. Accordingly, the foregoing description should not be read as pertaining only to the precise structures described and shown in the accompanying drawings, but rather should be read as consistent with and as support for the following claims, which are to have their fullest and fairest scope.

What is claimed is:

1. A wellbore cable, comprising:
   three conductors, each comprising a cable core encased in a polymeric jacket, an inner armor wire layer disposed against the cable core at a lay angle, and a polymeric layer encasing the inner armor wire layer, wherein an additional armor wire layer covers a predetermined percentage of the circumference of the inner armor wire layer, wherein the predetermined percentage and radial spacing are selected to prevent torque imbalance in the cable, wherein the predetermined percentage is from 50 percent to 90 percent, and wherein the additional armor wire layer has strength members with a greater diameter than strength members in the inner armor wire layer; and
   a soft polymer central element disposed between the three conductors, wherein the soft polymer central element is deformed completely filling the interstitial space between the conductors, the conductors cabled together helically at a lay angle opposite the lay angles of the respective armor wires in the conductors to prevent torque imbalance in the cable.

2. The cable of claim 1 wherein torque balance between the conductors is achieved by adjustments in the opposing lay angles of the armor wires and the completed cable.

3. The cable of claim 1 further comprising a final polymeric jacket encasing the three conductors.

4. The cable of claim 1 wherein a diameter of a circle passing through the centers of each of the conductors is approximately the same size as the individual diameter of each of the three conductors.

5. The cable of claim 1 wherein the cable cores comprise at least one of a monocable, a coaxial cable, a triad cable, and a heptacable.

6. The cable of claim 1 wherein at least one of the cable cores comprises an optical fiber.

7. A wellbore cable, comprising:
a cable core comprising a soft polymer central element disposed between three conductors, wherein the soft polymer central element is deformed completely filling the interstitial space between the conductors;
at least a first armor wire layer comprising a plurality of strength members and surrounding the cable core;
at least one layer of a polymeric material surrounding the cable core and the first armor wire layer and defining a predetermined radial thickness; and
at least a second armor wire layer comprising a plurality of strength members surrounding the first armor wire layer and partially disposed within the polymeric material, the polymeric material defining a predetermined radial spacing between the first armor wire layer and the second armor wire layer, the second armor wire layer covering a predetermined percentage of the circumference of the first armor wire layer, wherein the predetermined percentage and the radial spacing are selected to prevent torque imbalance in the cable, wherein the predetermined percentage is from 50 percent to 90 percent, and wherein a diameter of the strength members in the second armor wire layer is greater than a diameter of the strength members in the first armor wire layer.

8. The cable of claim 7 wherein the strength members of the second armor wire layer comprise at least one stranded armor wire member.

9. The cable of claim 7 wherein the polymeric material bonds to the first armor wire layer, the second armor wire layer, and the cable core.

10. The cable of claim 7 wherein the cable core further comprises a polymeric insulating layer and wherein the polymeric material bonds to the insulating layer of the cable core.

11. The cable of claim 7 further comprising a polymeric jacket forming an outer layer of the cable, the jacket bonded to at least the second armor wire layer.

12. The cable of claim 11 wherein the polymeric jacket comprises a fiber-reinforced polymer.

13. The cable of claim 7 wherein the cable core comprises one of a monocable, a coaxial cable, a triad cable, and a heptacable.

14. The cable of claim 7 wherein the cable core comprises a plurality of conductors and wherein at least one of the conductors of the plurality of conductors comprises an optical fiber.

15. The cable of claim 7, wherein the cable core comprises an optical fiber.

16. The cable of claim 7, wherein a diameter of a circle passing through the centers of each of the conductors is approximately the same size as the individual diameter of each of the three conductors.

* * * * *